United States Patent [19]

Elmer

[11] 4,076,945
[45] Feb. 28, 1978

[54] METHOD FOR MAKING URETHANE-TERMINATED POLYCARBODIIMIDES AND PRODUCTS THEREOF

[75] Inventor: Otto C. Elmer, Akron, Ohio

[73] Assignee: The General Tire & Rubber Company, Akron, Ohio

[21] Appl. No.: 771,708

[22] Filed: Feb. 24, 1977

Related U.S. Application Data

[63] Continuation of Ser. No. 186,779, Oct. 5, 1971, abandoned.

[51] Int. Cl.$^2$ .............................................. C07C 101/44
[52] U.S. Cl. ............................... 560/25; 260/2.5 BF; 260/77.5 AT; 260/45.85 N
[58] Field of Search ...... 260/471 C, 2.5 BF, 77.5 AT; 560/25

[56] References Cited

U.S. PATENT DOCUMENTS

| | | | |
|---|---|---|---|
| 2,941,966 | 6/1960 | Campbell | 260/2.5 BF |
| 2,969,386 | 1/1961 | McElroy | 260/471 R |
| 3,115,479 | 12/1963 | Windemuth | 260/77.5 AT |
| 3,502,722 | 3/1970 | Neumann | 260/77.5 AT |
| 3,969,288 | 7/1976 | Cenker et al. | 260/471 C |

FOREIGN PATENT DOCUMENTS 1,086,091  10/1967  United Kingdom ............. 260/471 C Primary Examiner—James O. Thomas, Jr.
Assistant Examiner—G. T. Breitenstein

[57] ABSTRACT

This invention concerns a method of making a urethane-terminated polycarbodiimide and the product resulting therefrom wherein the product displays unique hydrolytic degradation stabilization properties for polyester urethane rubbers and peroxide cured hydrocarbon rubbers. The method involves reacting an arylene diisocyanate with a stoichiometric deficiency of a primary or secondary aliphatic alcohol containing no other isocyanate-reactive substituents, thereby converting less than all of the isocyanate groups to urethane groups, and thereafter admixing thereto a carbodiimide-forming catalyst to polymerize the unconverted isocyanate groups and form the urethane-terminated polycarbodiimide.

5 Claims, No Drawings

METHOD FOR MAKING URETHANE-TERMINATED POLYCARBODIIMIDES AND PRODUCTS THEREOF

This is a continuation of application Ser. No. 186,779 filed Oct. 5, 1971 and now abandoned.

BACKGROUND OF THE INVENTION

Carbodiimides are a known class of compounds and have found wise use as stabilizers for rubbers, plastics and other materials. Polymeric carbodiimides have found special use as stabilizer against hydrolytic degradation in polyester urethane rubbers. Polymeric carbodiimides are generally formed through the polymerization of a diisocyanate upon treatment with phospholine oxide catalysts. Many of these polycarbodiimides, however, exhibit only limited storage stability through reasons not fully known but believed to be related in some way to the free terminal isocyanate groups remaining on the polycarbodiimide molecule.

The prior art has attempted to improve the storability of polymeric carbodiimides by treating them with a primary or secondary aliphatic alcohol to convert the free isocyanate groups to urethane groups. Specifically, in United States Patent 2,941,983, a urethane-terminated polycarbodiimide is described as being prepared by reacting a diisocyanate or isocyanate terminated linear polymer with a carbodiimide-forming catalyst and controlling the degree of polymerization by monitoring the volume of carbon dioxide given off during the polymerization. Upon reaching a pre-calculated amount of evolved carbon dioxide, polymerization is stopped by introducing a primary or secondary aliphatic alcohol into the reaction mixture to convert the remaining isocyanate groups to urethane groups.

The resulting urethane-terminated polycarbodiimide is limited to a relatively low molecular weight range and requires the utmost care in monitoring the amount of carbon dioxide evolved from the polymerization reaction. Small errors in either the amount of carbon dioxide found to be given off or in the amount of primary or secondary alcohol added to the reaction to terminate the polymerization will lead to either free alcohol groups or free isocyanate groups in the resulting product leading to instability during prolonged storage. In addition, when unsymmetrical arylene diisocyanates such as 2,4-toluene diisocyanate are used in the process, the terminal isocyanate groups are found to be predominantly positioned adjacent the methyl group which sterically hinders the isocyanate group from further reaction.

SUMMARY OF THE INVENTION

This invention is an improved method for producing urethane-terminated polycarbodiimides which is accomplished generally by first reacting an arylene diiocyanate with a stoichiometric deficiency of a primary or secondary aliphatic alcohol, to convert less than all of the isocyanate groups to urethane groups, and thereafter admixing thereto a carbodiimide-forming catalyst to polymerize the partially urethane-terminated arylene diiocyanate through the unreacted isocyanate groups to form a completed urethane-terminated polycarbodiimide. Such a method may be used to produce urethane-terminated polycarbodiimides of a reproducible structure and of a wider molecular weight range than is occasioned in the prior art process. Furthermore, there is no need to monitor the evolution of carbon dioxide from the polymerization reaction, thus substantial errors are eliminated. Still further, the reaction insures against the existence of free isocyanate groups or alcohol groups in the final product, thus eliminating storage problems.

The product produced by the method described and claimed herein is significantly different in structure and properties from urethane-terminated polycarbodiimides produced by prior art processes. These significant differences show up as better storability of the product, improved anti-hydrolytic degradation properties, improved thermal stability, a complete absense of isocyanate group peaks in the infra-red absorption spectra and a significant difference in reaction speed between this particular product and those of the prior art with well recognized reactants such as 2-ethyl-hexanoic acid and acetic acid.

Therefore, the main object of this invention is to provide a process of producing urethane-terminated polycarbodiimides wherein the process is easier to control and monitor, where the urethane-terminated polycarbodiimides produced thereby are of a reproducible molecular structure of broader molecular weight range than heretofore possible and where the product exhibits improved storability, improved high temperature stability and improved anti-hydrolytic stabilization properties. Another object is to provide a method of making urethane-terminated polycarbodiimides of a wider and more controllable molecular weight range without the heretofore required monitoring of evolved carbon dioxide from the carbodiimide-forming reaction and without the possibility of free alcohol and isocyanate groups in the completed product. Another object is to provide a method of producing a urethane-terminated polycarbodiimide with high proportion of hindred carbodiimide groups. These and other objects are satisfied by this invention.

DESCRIPTION OF THE PREFERRED EMBODIMENT

The method of this invention is practiced by reacting an arylene diisocyanate with a stoichiometric deficiency of an alcohol selected from the group consisting of primary and secondary alcohols, containing no other substituents reactive with isocyanates, to convert less than all of the isocyanate groups to urethane groups and then to admix thereto a carbodiimide-forming catalyst to polymerize the partially urethane-terminated arylene diisocyanate to a urethane-terminated polycarbodiimide. Preferably, the ratio of alcohol hydroxyl groups to isocyanate groups is in the range of from about 1:4 to 1:40.

A wide range of arylene diisocyanates can be utilized in this process including, for example, toluene 2,4-diisocyanate, toluene 2,6-diisocyanate, 2-methyl napthalene 1,5-diisocyanate, 3-methyl-4,4'-diisocyanatodiphenylmethane, 3-chloro-4,4'-diisocyanatodiphenylmethane, 3-methoxy-4,4'-diisocyanatodiphenylmethane, 2,4-diisocyanatochlorobenzene and cumene 2,4-diisocyanate.

Where one isocyanate group is appreciably more reactive than the other such as in the case of toluene 2,4-diisocyanate wherein the isocyanate group in the 4 position is substantially more reactive than the isocyanate group in the 2 position due to the absence of steric influence in the 4 position and the presence of steric hinderance in the 2 position by the methyl group in the 1 position, the urethane termination on the polycarbodiimide is substantially free of hinderance while the carbodiimide groups are relatively highly hindered. This is because the initial reaction with the aliphatic primary or secondary alcohol occurs with the more reactive groups, e.g., the isocyanate group in the 4 position of toluene 2,4-diisocyanate and thereafter the polymerization into the carbodiimide structure occurs through the free isocyanate groups located in the hindered 2 position. This is substantially different than what occurs when the arylene diisocyanate is first polymerized into the carbodiimide since in that case the polymerization would take place at the more reactive sight, i.e., the isocyanate group in the 4 position, leaving the unreacted isocyanate group in the 2 position as the one to become terminated by reaction with the aliphatic alcohol. The resultant product of that particular type of reaction would be a urethane termination in a sterically hindered position while the carbodiimide group would be relatively unhindered and more reactive. Other arylene diisocyanates having unequal reaction rates with the respective isocyanate groups include m-xylene 2,5-diisocyanate and 3,5-dimethylbiphenyl-4,4'-diisocyanate.

Arylene diisocyanates having groups of equal reactivity are also useful in this invention and may be blended with arylene diisocyanates of different reactive isocyanate groups such as toluene 2,4-diisocyanate to produce a wide range of "tailormade" carbodiimide reaction stocks. Examples of these arylene diisocyanates having isocyanate groups of equal reactivity include toluene 2,6-diisocyanate, p-phenylenediisocyanate and 4,4'-diisocyanatodiphenylmethane (known popularly as "MDI"). Other useful starting materials in terms of arylene diisocyanate include blends of diisocyanates wherein the reaction rate of the isocyanate groups of the different moieties have substantially different reaction rates such as blends of 4,4'-diisocyanatodiphenylmethane with durene diisocyanate.

The primary and secondary aliphatic alcohols which are reacted with the arylene diisocyanate to form the partially urethane-terminated arylene diisocyanatcan be selected from the group consisting of primary and secondary aliphatic alcohols that contain no other substituents reactive with isocyanates. Examples of these alcohols are methyl alcohol, ethyl alcohol, isopropyl alcohol, secondary buyl alcohol, isoamyl alcohol, n-hexanol, cyclohexanol, 2-chloro-1-propanol, 2-octanol, methylphenylcarbinol, benzyl alcohol, diethylene glycol mono-n-butyl ether and cinnamyl alcohol. It is preferable that the alcohols contain no more than about twelve carbon atoms. Tertiary alcohols and phenols, cresols, naphthols and other compounds in which the hydroxyl group is directly attached to an aromatic ring are not suitable.

A stoichiometric deficiency of alcohol is reacted with the arylene diisocyanate so that less than all of the isocyanate groups are converted to urethane groups. In this manner the molecular weight of the final urethane-terminated polycarbodiimide may be accurately and reproducibly controlled. To calculate the theoretical molecular weight Mn the structural formula is theoretically set forth below:

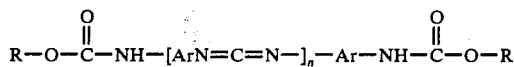

where Ar is an aromatic group of the arylene diisocyanate and R is an organic group of the alcohol. According to the formula therefore:

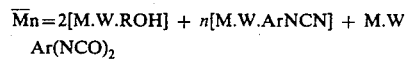

As an example, when ROH is methanol, Ar(NCO)$_2$ is toluene 2,4-diisocyanate, ArNCN is

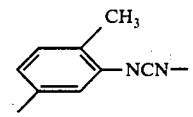

and $n=3$, one arrives at a theoretical molecular weight of 628. The molecular weight can also be calculated from the carbodiimide "NCN" content of the formed product by the formula, $$\overline{Mn} = M.W.\ ArNCN \left[ \frac{2M.W.\ ROH + M.W.\ Ar(NCO)_2}{\frac{4000}{\%NCN} - M.W.\ ArNCN} \right] +$$

$$M.W.\ Ar(NCO)_2 + 2M.W.\ ROH$$

Thus, the molecular weight can be pre-calculated by the above formula and thereafter checked as to accuracy by titrating with standard HCl the guanidine formed by the addition of ethylamine to a sample of the polycarbodiimide formed. By this method the evolution of carbon dioxide from the polymerization of the partially urethane-terminated arylene diisocyanate into a polycarbodiimide need not be monitored but may be allowed to freely evolve thus eliminating potential errors set into the final product due to errors in monitoring the carbon dioxide content as with the prior art process.

The solvent used as the vehicle in which the arylene diisocyanate is reacted with the stoichiometric deficient quantity of primary or secondary aliphatic alcohol should contain no groups that are reactive with isocyanates or alcohols under the conditions of polymerization. In other words, the solvent should not contain any active hydrogen atoms that would react with the isocyanate groups. In addition, the solvent should readily dissolve the arylene diisocyanate, the aliphatic alcohol and the formed polymeric carbodiimide. Examples of useable solvents herein include benzene, toluene, the xylenes, ethyl benzene, isopropyl benzene, mesitylene, cyclopentane, n-hexane, cyclohexane, n-heptane methyl cyclohexane, tetramethylethylene, diisobutylene, chlorobenzene, methylene chloride, ethylidene chloride, chloroform, carbon tetrachloride, ethylene chloride, methylenebromide, o-dichlorobenzene, bis-chloromethylether, bis-isopropylether, dioxane, tetrahydrofuran and pyridine.

The reaction between the aliphatic alcohol and the arylene diisocyanate is exothermic, and it is generally considered proper not to allow the exotherm to take the reactive mixture higher than about 50° C. In the presence of large amounts of solvents the solution may have to be heated to reach this temperature. After complete reaction between the two moieties the mixture is cooled to near room temperature, and a polycarbodiimide-forming catalyst is added to polymerize the partially urethane-terminated arylene diisocyanate to a urethane-terminated polycarbodiimide through reaction between the free isocyanate groups, i.e., those left over from the reaction between the alcohol and the arylene diisocyanate.

Catalyst useful in preparing the urethane-terminated polycarbodiimides include phospholines, phospholine oxides and sulfides. The phospholine oxides and sulfides are described in U.S. Pat. Nos. 2,663,737 and 2,663,738. The phospholine oxides are described in U.S. Pat. 2,663,739. The corresponding phospholines and phospholidines may be prepared by a lithium aluminum hydride reduction of the corresponding dichlorophospholine or phospholidine. These dichloro compounds are also used to prepare the above mentioned oxides and sulfides and are described in U.S. Pat. No. 2,663,736. Representative examples of suitable catalysts are 1-ethyl-3-phospholine, 1-ethyl-3-methyl-3-phospholine-1-oxide, 1-ethyl-3-methyl-3-phospholine-1-sulfide, 1-ethyl-3-methyl-phospholidine and 1-ethyl-3-methyl-phospholidine-1-oxide. The preferred catalyst is 1-phenyl-3-methyl-3-phospholine-1-oxide. The particular amount of catalyst used will depend to a large extent on the reactivity of the catalyst itself and the organic polyisocyanate being used. A concentration range of 0.1–10 parts by weight of catalyst per 100 parts by weight of organic diisocyanate is suitable. About 0.5–1.0 parts of the preferred catalyst is satisfactory when diisocyanates such as toluene diisocyanate are being polymerized.

Either during or after polymerization of the diisocyanate to the polycarbodiimide, fillers and other finely divided particulate matter may be added to the reaction mixture in order to dilute the formed polycarbodiimide and provide a practical and useable carrying vehicle for the final product. These particulate fillers may include carbon black, clay, silica, talc, zinc and magnesium oxides, calcium and magnesium carbonate, titanium dioxide and plasticizers. The polycarbodiimides of the present invention are usually solids whose physical properties depend in large part upon the particular arylene diisocyanate or blends of arylene diisocyanates used in the reaction and the ratio of alcohol to isocyanate. Infra-red spectra of the urethane-terminated polycarbodiimides exhibit a single NCN peak at 2130 cm.$^{-1}$, clearly indicating that there is a complete absence of free isocyanate groups in the final product.

The following examples are intended to illustrate the best presently-known mode of practicing this invention and are not intended to limit this invention the scope of which is properly delineated in the claims. Unless otherwise specified, all parts are parts by weight and all percentages are percentages by weight.

EXAMPLE I

A urethane-terminated polycarbodiimide was prepared by the method of this invention as follows: 1000 ml. of dry toluene was added to a cleaned and dried reactor and blanketed with dry nitrogen. 290 grams of a mixture of 2,4 and 2,6 toluene diisocyanate isomers in a ratio of 4:1 was added to the toluene in the reactor and the mixture agitated. 26.66 grams of dry methyl alcohol was added dropwise under a nitrogen blanket to the agitated mixture of toluene diisocyanate in toluene while the jacket of the reactor was cooled so that the exotherm of the reaction did not take the mixture higher than 50° C. Agitation was continued and the temperature of the reaction maintained at 40° to 45° C. for 2 hours. The reaction mixture was then cooled to room temperature, and 1.333 grams of 1-phenyl-3-methyl-3-phospholine-1-oxide was added thereto. The reaction mixture was slowly heated while a stream of dry nitrogen was bubbled therethrough. The progress of the reaction was monitored by observing the infra-red absorption spectra of the solution between 2000 and 2500 cm.$^{-1}$ wavenumbers. The N═C═O peak at 2270 cm. disappeared while the N═C═N peak at 2130 cm.[1] appeared and ultimately remained the only absorption peak in the region. Thus, it is seen that the isocyanate groups began to disappear and the carbodiimide groups began to appear in replacement thereof to indicate, when the N═C═O peak at 2270 cm.$^{-1}$ had disappeared, that the product contained no free isocyanate groups.

This method was repeated using different alcohols and different amounts of alcohol and toluene diisocyanate to form polycarbodiimides of varying NCN/urethane ratios and varying molecular weights. These repeated tests and the results thereof are shown below in Table I.

TABLE I

| Alcohol (ROH) | TDI/ROH Mol. Ratio Charged | NCN/HNC(=O)OR Ratio in Product | Theo. Mol. Wt. | I/PO Det'n Mol. Wt. | Theo. % NCN | Act % NCN |
|---|---|---|---|---|---|---|
| 2-ethyl hexanol | 2 | 1.5 | 824 | 680 | 14.6 | 14.1 |
| methanol | 2 | 1.5 | 626 | 570 | 19.1 | 19.6 |
| methanol | 2 | 1.5 | 626 | 520 | 19.1 | 18.8 |
| methanol | 4 | 3.5 | 1148 | 1290 | 24.4 | 24.6 |
| methanol | 8 | 7.5 | 2188 | 1670 | 27.5 | 27.6 |

This example shows some of the parameters that can be varied to produce urethane-terminated polycarbodiimides of varying molecular weights and structures.

EXAMPLE II

Two samples were prepared using the same materials in the same amounts as the first two runs in Table I but following the procedures set forth in U.S. Pat. No. 2,941,983. The products were permitted to remain in a benzene solution and were stored for a period of time to observe their stability. The samples and the observations of their storability are shown below in Table II.

TABLE II

| Preparation | Alcohol | Storage* Observation |
|---|---|---|
| By Example I | 2-ethyl hexanol | fluid, slightly Cloudy solution |
| U.S. Pat. No. 2,941,983 | 2-ethyl hexanol | yellow, gelled solid |
| By Example I | methanol | fluid, slightly cloudy solution |

TABLE II-continued

| Preparation | Alcohol | Storage* Observation |
|---|---|---|
| U.S. Pat. No. 2,941,983 | methanol | heavy white precipitate formed after 2 days |

*stored at room temperature in sealed glass bottles for four weeks.

This example shows the superior storability of urethane terminated polycarbodiimides made by the method of this invention over the same products made by prior art processes.

EXAMPLE III

The procedure described in Example I was repeated and the 26.66 grams of dry methanol replaced by an equal molar amount of 2-ethyl hexanol. Samples of the respective polycarbodiimide of Example I and the corresponding 2-ethyl hexanol-based material were separately reacted with 0.25 N 2-ethyl hexanoic acid in benzene. Samples of similar polycarbodiimides were prepared utilizing the techniques set forth in U.S. Pat. No. 2,941,983, and these products were also reacted at equal concentration in a benzene solution with 0.25 N 2-ethyl hexanoic acid. The polycarbodiimides prepared by the method of this invention reacted substantially slower than those prepared by the patented prior art method indicating significant differences in the structures or of the pendant group placements on the polycarbodiimides.

Similar results were obtained when the four different polycarbodiimides were reacted at equal concentration in a benzene solution with acetic acid.

This example further shows the substantial differences in molecular structure of the urethane-terminated polycarbodiimides produced by these two processes.

EXAMPLE IV

Samples of the materials prepared in Example III were vacuum stripped of benzene and the solid products recovered. Conventional differential thermal analysis (DTA) and thermogravimetric analysis (TGA) were then performed. While the differential thermal analysis showed no major endotherm or exotherm in either of the products, the thermogravimetric analysis revealed that the products prepared by the method of this invention were thermally more stable than those prepared by prior art processes. Data from the conventional thermogravimetric analysis (TGA) test appear below in Table IV.

TABLE IV

| Process | Temperature at 10% Weight Loss | 600° C. Weight Loss |
|---|---|---|
| This invention | 275° C. | 30% |
| U.S. Pat. No. 2,941,983 | 244° C. | 36% |

This example show that the structure of the urethane-terminated polycarbodiimide prepared by the method of this invention differs substantially from that of the product prepared by prior art processes in that the conventional TGA tests revealed that the the product produced by the method of this invention has a lower weight loss at 600° C. and a higher temperature of decomposition than the corresponding prior art product.

EXAMPLE V

A conventional, peroxide-curable polyester urethane rubber compound was prepared according to the formulation shown below in Table V(A). The formulation was milled until all the ingredients were evenly dispersed throughout the rubber phase. The mixture was divided into three portions. A first portion (Sample A) was used without further addition. To a second portion (Sample B) was added 4 parts of a commercial polycarbodiimide per 100 parts of polyester urethane. To a third portion (Sample C) was added 4 parts per 100 parts of urethane of a urethane-terminated polycarbodiimide having a molecular weight of about 600 prepared by the method of this invention and using methanol and the toluene diisocyanate employed in Example I. The three samples were milled, and tensile sheet specimens were cut from the sheets and press cured 20 minutes at 320° F. Original properties and properties after aging 24 hours in an aircirculated oven at 300° F. were determined and appear below in Table V(B).

TABLE V(A)

| Ingredient | Parts |
|---|---|
| a commercial millable polyester urethane | 100 |
| FEF carbon black | 25 |
| 40% dicumyl peroxide on calcium carbonate | 4.5 |

TABLE V(B)

| Properties | Sample A | Sample B | Sample C |
|---|---|---|---|
| Original | | | |
| 300% modulus, psi | 2100 | 1850 | 1975 |
| tensile strength, psi | 4625 | 4300 | 4150 |
| elongation, % | 560 | 560 | 560 |
| hardness, Shore A | 60 | 60 | 60 |
| Aged 24 hours at 300° F. in air | | | |
| 300% modulus, psi | 1050 | 950 | 1700 |
| tensile strength, psi | 3200 | 2950 | 2750 |
| elongation, % | 710 | 770 | 470 |
| hardness, Shore A | 56 | 59 | 62 |

This example clearly shows the improvement in heat stabilization imparted to peroxide cured polyester urethane rubbers using the urethane terminated polycarbodiimides of this invention over those prepared by prior art methods. Note that original 300% modules values are roughly equal for all three samples, after aging 24 hours at 300° F. in air, the 300% modulus is reduced by 50% for sample A, containing no polycarbodiimide, even further reduced for sample B, containing a commercial polycarbodiimide made by the prior art process, however, decreased only slightly from its original value in sample C, containing the urethane terminated polycarbodiimide prepared by this invention.

EXAMPLE VI

Another conventional peroxide-curable polyester urethane rubber compound was prepared according to the formulation shown below in Table VI(A). The formulation was milled until all the ingredients were evenly dispersed throughout the rubber phase. The mixture was divided into three portions. A first portion (Sample D) was used without further additives. To a second portion (Sample E) was added 4 parts of a commercial polycarbodiimide stabilizer per 100 parts of polyester urethane. To a third portion (Sample F) was added 4 parts per 100 parts of urethane of a urethane-terminated polycarbodiimide prepared by the method of this invention using methanol and the toluene diisocyanate employed in Example I. The three samples were milled, and tensile sheet specimens were cut from the sheets and press cured 20 minutes at 320° F. The original properties and properties after aging 70 hours in water at 200° F. were determined and appear below in Table VI(B).

TABLE VI(A)

| Ingredient | Parts |
|---|---|
| a commercial millable polyester urethane | 100 |
| SAF carbon black | 25 |
| 40% dicumyl peroxide on calcium carbonate | 6.0 |
| stearic acid mill lubricant | 0.2 |

TABLE VI(B)

| Properties | Sample D | Sample E | Sample F |
|---|---|---|---|
| Original | | | |
| 300% modulus, psi | 1950 | 1863 | 1892 |
| tensile strength, psi | 6667 | 5838 | 5892 |
| elongation, % | 580 | 560 | 570 |
| hardness, Shore A | 63 | 66 | 67 |
| Aged 70 hours in water at 200° F. | | | |
| 300% modulus, psi | 50 | 950 | 1325 |
| tensile strength, psi | 275 | 4025 | 3575 |
| elongation, % | 1220 | 640 | 550 |
| hardness, Shore A | 26 | 60 | 65 |

This example clearly shows the improvement in hydrolytic stabilty imparted to peroxide-cured polyester urethane rubbers using the urethane-terminated polycarbodiimides of this invention over those prepared by prior art methods. By far the best retention of overall properties, especially 300% modulus, was achieved by Sample F.

I claim:

1. A urethane-terminated polycarbodiimide prepared by:

1 reacting at a temperature of no more than about 50° C. an arylene diisocyanate in which the isocyanate groups are of unequal reactivity and being selected from the group consisting of toluene 2,4-diisocyanate, 2-methyl napthalene 1,5-diisocyanate, 3-methyl-4,4'-diisocyanatodiphenylmethane, 3-chloro-4,4'-diisocyanatodiphenylmethane, 3-methoxy-4,4'-diisocyanatodiphenylmethane, 2,4-diisocyanatochlorobenzene, cumene 2,4-diisocyanate, m-xylene 2,5-diisocyanate and 3,5-dimethylbiphenyl-4,4'-diisocyanate with a stoichiometric deficiency of a primary or secondary aliphatic alcohol selected from the group consisting of methyl alcohol, ethyl alcohol, isopropyl alcohol, secondary buyl alcohol, isoamyl alcohol, n-hexanol, cyclohexanol, 2-chloro-1-propanol, 2-octanol, methylphenylcarbinol, benzyl alcohol, diethylene glycol mono-n-butyl ether, cinnamyl alcohol and 2-ethyl hexanol to convert less than all of the isocyanate groups to urethane groups;

2 cooling the mixture to near room temperature; and 3 admixing therewith a carbodiimide-forming catalyst and polymerizing the partially urethane-terminated arylene diisocyanate to a urethane-terminated polycarbodiimide that exhibits a single N=C=N peak at 2130 cm.$^{-1}$ and is free of other peaks in the 2000 to 2500 cm.$^{-1}$ band under infrared inspection.

2. The product of claim 1 wherein the carbodiimide-forming catalyst is 1-phenyl-3-methyl-3-phospholine-1-oxide.

3. The product of claim 1 wherein said reaction (1) is performed in an inert solvent.

4. The product of claim 1 wherein said arylene diisocyanate contains additionally blended therewith an arylene diisocyanate having isocyanate groups of equal reactivity.

5. The product of claim 1 where in said reaction (1) the amount of alcohol is such that the ratio of alcohol hydroxyl groups to isocyanate groups is in the range of from about 1:4 to 1:40.

* * * * *